US006742403B2

(12) United States Patent
Thomas

(10) Patent No.: US 6,742,403 B2
(45) Date of Patent: Jun. 1, 2004

(54) BRAZE STRENGTH TESTING TOOL FOR BRAZE-ON SAW TIPS

(75) Inventor: Charles Frederick Thomas, Kelowna (CA)

(73) Assignee: Camco Cutting Tools Ltd., Kelowna (CA)

( * ) Notice: Subject to any disclaimer, the term of this patent is extended or adjusted under 35 U.S.C. 154(b) by 20 days.

(21) Appl. No.: 10/308,102

(22) Filed: Dec. 3, 2002

(65) Prior Publication Data

US 2003/0115971 A1 Jun. 26, 2003

Related U.S. Application Data

(60) Provisional application No. 60/341,231, filed on Dec. 20, 2001.

(51) Int. Cl.[7] ............................ G01L 5/24; B23D 63/00

(52) U.S. Cl. ...................................... 73/862.21; 76/112

(58) Field of Search ......................... 73/862.21, 862.19, 73/862.08; 76/112

(56) References Cited

U.S. PATENT DOCUMENTS 3,733,934 A 5/1973 Stevenson
3,736,828 A 6/1973 Funakubo
3,820,419 A 6/1974 McLagan
3,960,310 A 6/1976 Nussbaum
4,071,141 A 1/1978 Gray
4,074,593 A 2/1978 Stier
4,082,014 A 4/1978 Idel
4,124,157 A * 11/1978 Walker .......................... 76/79
4,144,777 A 3/1979 Nystrom et al.
4,205,564 A 6/1980 Kolb et al.
4,265,023 A * 5/1981 Frost et al. ................. 356/614
4,358,045 A 11/1982 Jacobsen
4,366,728 A 1/1983 Beck et al.
4,407,172 A 10/1983 Kolb et al.
4,786,779 A 11/1988 Fushimi et al.
4,864,896 A 9/1989 Pfaltzgraff
4,911,037 A 3/1990 Werz
5,040,436 A 8/1991 Pfaltzgraff
5,265,500 A 11/1993 Gunzner et al.
5,299,472 A 4/1994 Ellis
5,758,561 A 6/1998 Curtsinger et al.
5,775,179 A 7/1998 Haas
5,896,800 A 4/1999 Curtsinger et al.
5,941,138 A 8/1999 Beck et al.
6,065,370 A 5/2000 Curtsinger et al.
6,067,888 A 5/2000 Achterberg et al.
6,205,902 B1 3/2001 Vuorinen

* cited by examiner

*Primary Examiner*—Edward Lefkowitz
*Assistant Examiner*—Takisha S Miller
(74) *Attorney, Agent, or Firm*—Antony C. Edwards

(57) ABSTRACT

A device mountable onto the head of a torque wrench for testing the braze strength of replaceable kerf or saw tips (referred to inter-changeably herein), the device includes a clamp supporting member for clamped mounting, at a first end thereof, to a braze-on saw tip brazed to a saw blade tooth, and for mounting, at an opposite second end of the member, to the head of the torque wrench. A clamp, for rigidly clamping the braze-on saw tip between opposed facing jaws of the clamp, is mounted to the clamp supporting member so as to orient the jaws on opposite sides of an axis of rotation of the head of the torque wrench when the head is mounted to the second end of the member.

11 Claims, 4 Drawing Sheets

BRAZE STRENGTH TESTING TOOL FOR BRAZE-ON SAW TIPS

CROSS REFERENCE TO RELATED APPLICATION

This application claims priority from U.S. Provisional Patent Application No. 60/341,231 filed Dec. 20, 2001 entitled Braze Strength Testing Clamp for Braze-On Saw Tips.

FIELD OF THE INVENTION

This invention relates to a lightweight clamp and in particular to a clamp, that, when removably attached to parallel sided kerf cutting tips brazed on to the attack face of the gullet on a saw blade blank, can be manually rotated by use of a torque wrench to determine the strength of the braze connection.

BACKGROUND OF THE INVENTION

Commercial lumber production utilizes high-speed saws, many of which have replaceable, pre-sharpened carbide kerf tips that are brazed oil to the attack face of the saw blade gullet. Such tips are subject to wear and dulling and on occasion, separation from the saw blade. These blades are re-sharpened at regular intervals and replaced as necessary. Separation of the kerf tip from a saw blade is a generally unexpected and unwelcome occurrence, resulting in the loss of production until the saw blade is replaced.

Quality testing of the braze strength between saw blade and kerf tip or kerf cutter (used alternatively herein) is therefore desirable, firstly for braze quality control, ensuring that separation due to inadequate braze strength is all but eliminated and secondly, to test a number of cutters on a blade where cutter separation has occurred, to determine if braze strength was a factor in the cutter separation.

Such cutters are usually provided per-tinned with high strength alloy and may be readily replaced on site, by positioning the replacement kerf cutter against the clean attack face of the saw blade and applying sufficient heat to melt the braze material.

Previously, the techniques for testing the strength of the braze connection between the saw blade and the kerf cutter have relied more upon operator judgment rather than on empirical data. In many cases the failure may not occur exactly at the bond between the saw plate and the saw tip. This can break or bend the saw plate or the saw tip and prevent the ability to inspect the bond area. For example, one technique requires that the cutter be gripped by vice grips or pliers and as heat is gradually applied to the area of the cutter, the vice grips are used to apply a rotational force on the cutter generally parallel to the axis of rotation of the saw. Upon separation of the cutter a visual inspection is made to determine the quality of the braze connection.

In another example, a block of hickory wood or UHMW material is used to strike the cutter in a direction generally parallel to the axis of rotation of the saw blade. The effect the blow has upon the cutter is then determined by eye.

A further example is that of securing the saw in a vice and applying a lateral pressure against the cutter by a hydraulic ram. The pressure required to cause cutter separation can then be observed.

SUMMARY OF THE INVENTION

The present invention is a braze strength testing clamp, which can be placed over a tooth on a saw blade, for example a circular saw. A through notch formed in the under side of the housing permits it to be positioned over and aligned with the braze-on saw tip or kerf cutting tip. Clamping means, secured to the housing, in the form of at least one movable jaw, can be brought into firm contact with the sides of a cutting tip mounted to the saw blade. A torque wrench is removably attachable to the housing.

Non-destructive testing of the braze connection between the cutting tip and the saw is possible by firstly noting the predetermined tabular value for the braze strength appropriate for the saw blade thickness and the tooth size being tested and manually loading the torque wrench, in an appropriate manner, until that value is achieved. Should the braze connection hold, the braze connection then is obviously satisfactory. On the other hand should the cutter tip separate under loading before the recommended force is applied then the braze is faulty and further testing such as microscopic examination and measurement of the braze thickness and anchor fillet is undertaken.

Destructive testing is carried out in a similar manner, however, such tests will determine the maximum strength of the braze connection.

In summary, the present invention is a device mountable onto the head of a torque wrench for testing the braze strength of replaceable kerf tips, the device includes a clamp supporting member for clamped mounting, at a first end thereof, to a braze-on saw tip brazed to a saw blade tooth, and for mounting, at an opposite second end of said member, to the head of the torque wrench. A clamp, for rigidly clamping the braze-on saw tip between opposed facing jaws of said clamp, is mounted to the clamp supporting member so as to orient said jaws on opposite sides of an axis of rotation of the head of the torque wrench when the head is mounted to said second end of said member.

The clamp supporting member may be an elongate bar or housing or otherwise adapted for holding a clamp so that a moveable jaw, which is at least one of the opposed facing jaws, may be translated, for example in a direction generally parallel to the axis of rotation of the saw blade, so as to clamp the braze-on saw tip on the opposite sides of the braze-on saw tip, that is the opposite sides of the braze-on saw tip generally parallel to the opposite sides of the saw blade. The braze-on saw tip is thereby clamped within a clamping space defined between the jaws. A selectively actuable actuator is provided for actuating the moveable jaw between a release position retracted away from an opposite opposed facing jaw, which may be fixed to the clamp supporting member or also moveable, and a clamp engaging position wherein the moveable jaw is translated, for example either slidably or pivotally, into clamping engagement with a braze-on saw tip between the jaws or, in the absence of the braze-on saw tip, into sufficiently close proximity for clamping upon the presence of the braze-on saw tip.

The clamp supporting member may be adapted, for example by waisting of the member, so as to not interfere either with the clamping space or with adjacent saw blade teeth and their corresponding braze-on saw tips on teeth adjacent to a tooth and braze-on saw tip clamped in said clamp clamping space. The clamp supporting member has a selectively engageable torque wrench mounting member, for example a bolt head, mounted to said member for releasable engagement with the head of the torque wrench, wherein said wrench mounting member has an axis of rotation which is co-axial with the axis of rotation of the head of the torque wrench when the torque wrench is mounted on the wrench mounting member. The axis of rotation of the mounting member also generally bisects the clamping space when the moveable jaw is in the clamp engaging position, or otherwise so as to be substantially coaxial with an axis of the braze-on saw tip which is substantially parallel to the brazing surface common to the clamped braze-on saw tip and the saw blade tooth.

The method of the present invention for testing the braze strength of a replaceable kerf tip brazed onto the tooth of a saw blade includes the steps of:

a) providing a braze strength testing tool as described above, b) mounting the torque wrench onto the torque wrench mount, c) mounting the jaws over the kerf tip and clamping the jaws onto the kerf tip so as to intersect the axis of rotation of the head of the torque wrench generally collinearly with a long axis of the kerf tip parallel to the braze joint, and d) rotating the torque wrench about it's axis of rotation and monitoring the torque level indicated by the torque wrench.

DETAILED DESCRIPTION OF EMBODIMENTS OF THE INVENTION

Figure 1:
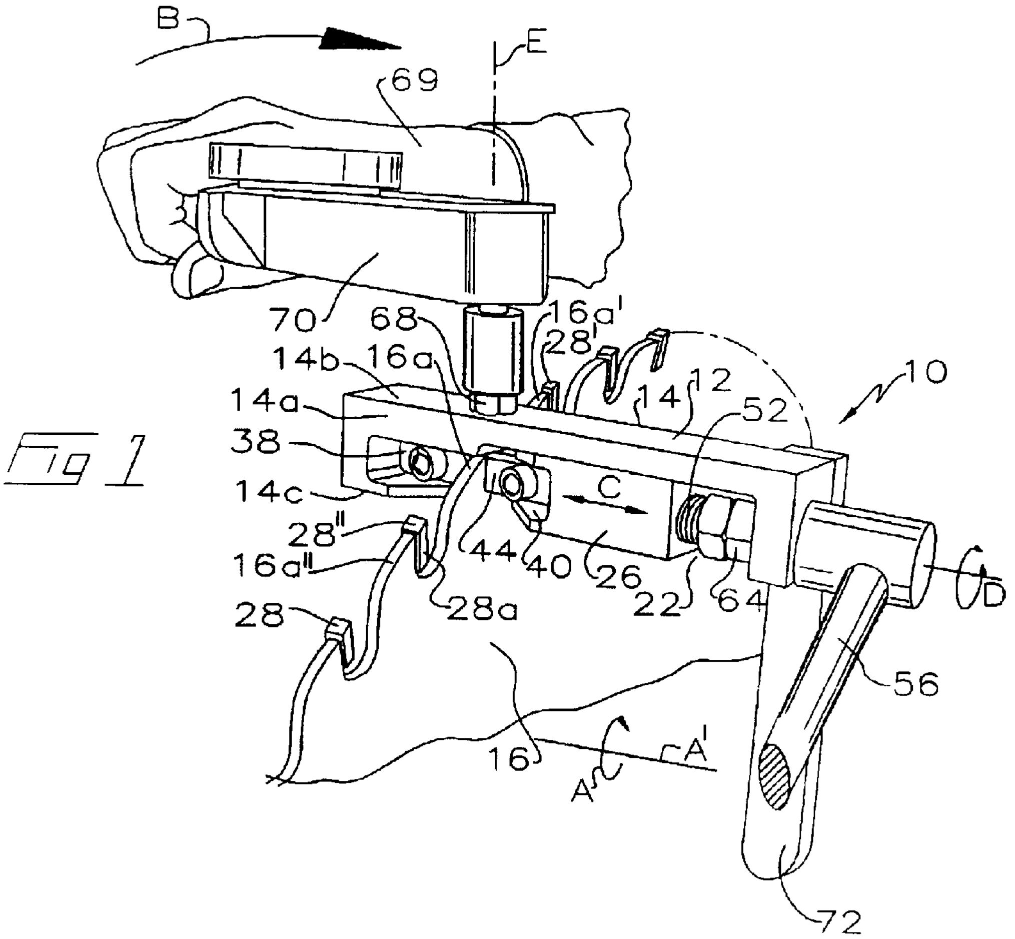
FIG. 1 is, in right side perspective view, the tool of the present invention mounted on a saw blade, a torque wrench mounted on the tool housing.
Figure 2:
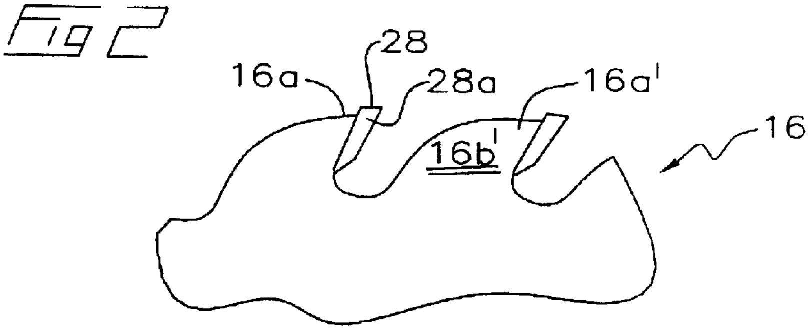
FIG. 2 is a partial side elevation of a circular saw blade with kerf cutting tips attached.

With reference to the drawing figures, wherein similar characters of reference denote corresponding parts in each view, braze strength testing tool 10 includes a generally rectangular bar or housing 12 having parallel, planar first and second opposite faces 14 and 14*a* and top and bottom opposite faces 14*b* and 14*c* respectively. First face 14 is positioned toward the operator when tool 10 is placed over a saw blade 16. A saw blade receiving notch 20 has its opening aperture formed in bottom face 14*c*. Notch 20 extends from bottom face 14*c* towards top face 14*b* in a plane orthogonal to the bottom face. V-shaped diverging walls 20*a* open at 45 degrees from notch 20 in a direction "A" downstream in the direction of rotation of the kerf cutters through notch 20. Such divergence eliminates any possible contact between the housing 12 and the shoulder 16*b*' of the immediate forwardly adjacent (forward in direction A when saw blade 16 is rotated about axis A') saw tooth 16*a'*.

Face 14*a* has a machined cavity or channel or recess 22 formed therein. Recess 22 accommodates the sliding action of clamping block 26 in the clamping mechanism. Block 26 may be slid by selective adjustment to rigidly clamp outer side edges 28*a* of a cutter tip 28 between the block and an opposed facing rigid surface such as first clamp jaw 38. Recess 22 has first and second parallel planar surfaces 32 and 34 respectively. First clamp jaw 38 is removably mounted to first surface 32 by bolt 38*a* or other fastening means, so as to have one of its ends 38*b* in edge alignment with a corresponding first edge of notch 20. First surface 32 is stepped slightly above second surface 34. Blade receiving notch 20 is formed in surface 32. Wall 36 is chamfered at 45 degrees so as to converge on notch 20 in the plane of bottom wall 14*c*.

Sliding clamp block 26 is slidably mounted on second surface 34 within recess 22. Block 26 has a 'U' shaped recess 40 formed in one of its ends closest to blade receiving notch 20. The walls 42 of recess 40 are sloped in a direction opposite to the slope of wall 36. A second clamp jaw 44 is mounted in recess 40, for example by bolt 44*a*, in opposed facing relation to first clamp jaw 38. Slide block 26 has a threaded bore 50 extending from recess 40 to the opposite end of the block. A first end of threaded rod 52 threadably mates in, so as to be journalled along bore 50. An opposite second end of rod 52 extends away from block 26, outwardly of housing 12, through smooth bore 54. Handle 56 is mounted to the second end of rod 52.

Sloping or chamfering of wall 36 and walls 42 of slide block 26 eliminates any possible contact between the clamp housing 12 and the kerf cutting tip 28" on the immediate rearwardly adjacent saw tooth 16*a"*.

Slide block 26 is slidably mounted to surface 34 by bolts 58 passing through elongated aperture 60 formed in first face 14. Aperture 60 is elongate in the direction of sliding C of block 26. Rotation in direction D of handle 56 and rod 52 results in concurrent movement of slide block 26 and second clamp jaw 44 in direction C. Such movement may be desirably limited in a direction away from blade receiving notch 20, by any suitable means such as jam nuts 64 mounted on threaded rod 52.

Figure 3:
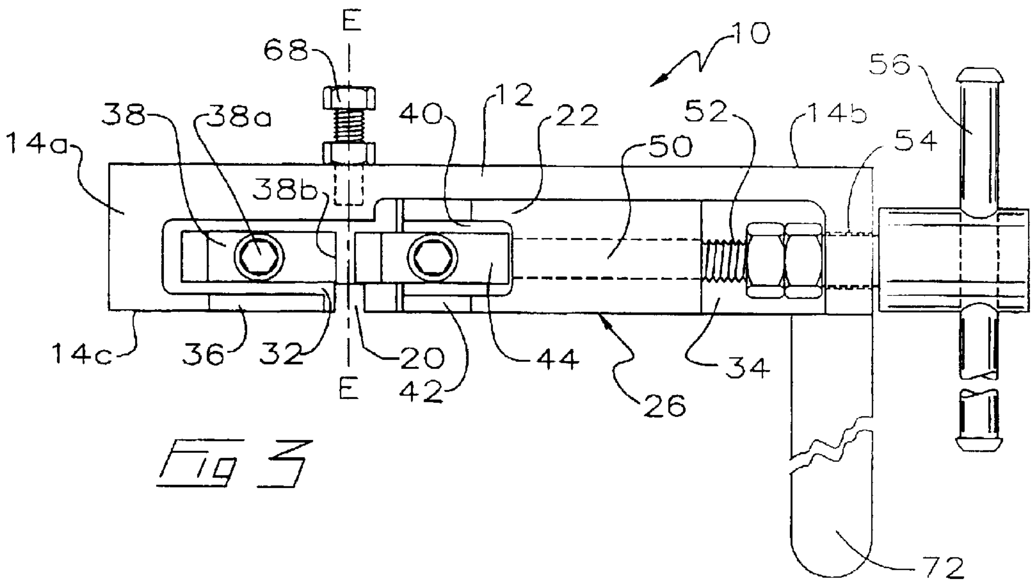
FIG. 3 is a front elevation of the tool of FIG. 1.
Figure 4:
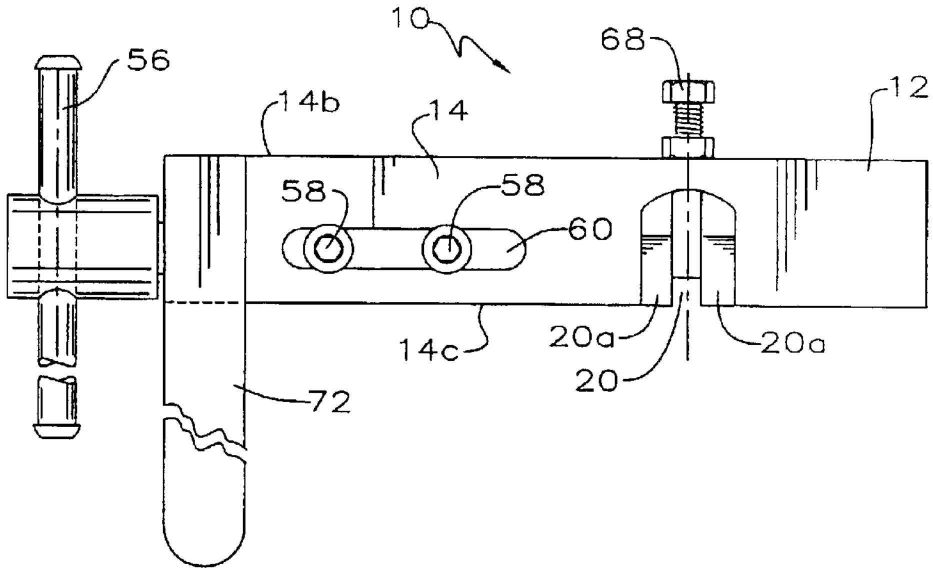
FIG. 4 is rear elevation of the tool of FIG. 3.
Figure 5:
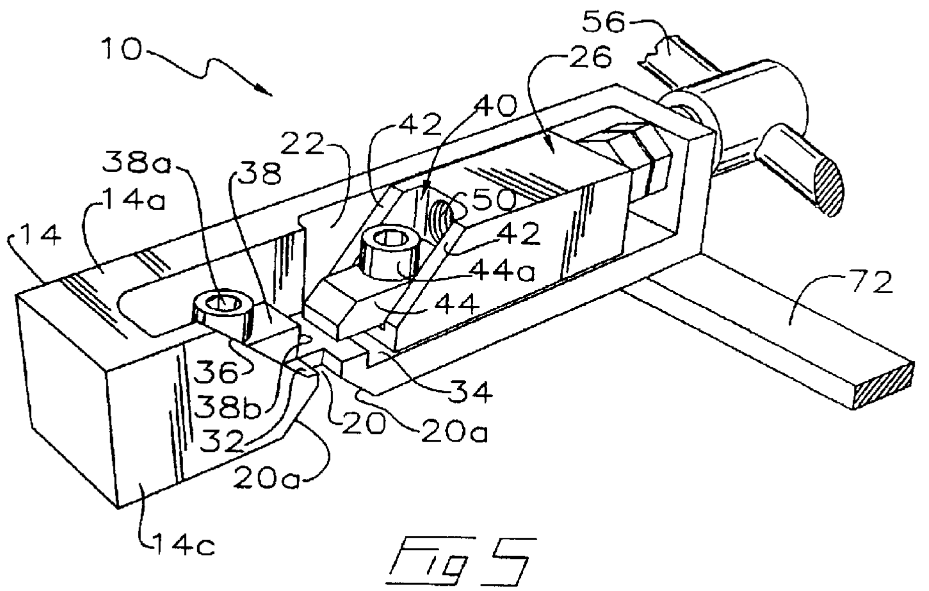
FIG. 5 is a bottom left side perspective view of the tool of FIG. 1.
Figure 5A:
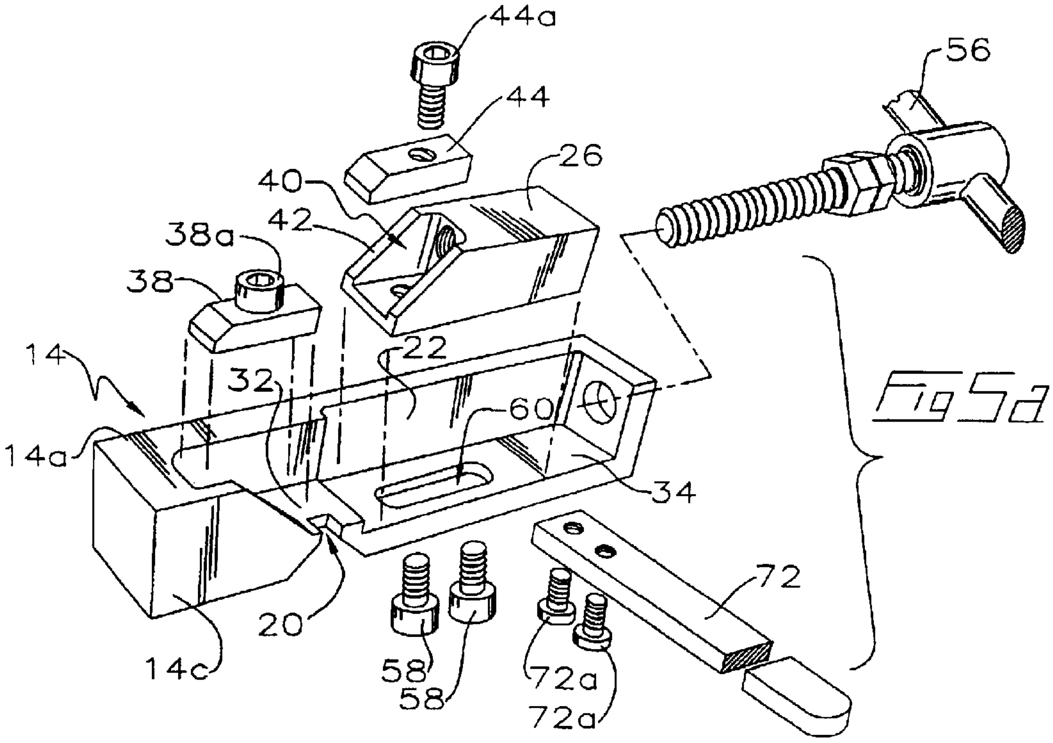
FIG. 5*a* is a partially exploded view of the tool of FIG. 5.

A bolt 68 is rigidly mounted to top face 14*b* in vertical alignment with the saw blade receiving notch 20, that is, with the longitudinal axis E of the bolt bisecting notch 20 when seen in FIGS. 3 and 4. Axis E is aligned so as to pass through substantially the centroid of cutter 28 when sides 28*a* of cutter 28 are clamped rigidly between jaws 38 and 44. Thus a torque applied to bolt 68 about axis E is communicated via housing 12 and the jaws to cutter 28 as a moment acting to twist cutter 28 from the corresponding face of tooth 16*a*. Such a rotation of the clamp housing 12 about axis E is achieved by a user 69 mounting a conventional torque wrench 70 onto bolt 68 and applying a steadily increasing force on wrench 70 in direction B, for example toward the user as illustrated in FIG. 1.

An auxiliary handle 72 may be mounted as by bolts 72*a* to first face 14 to assist user 69 in the positioning of clamp housing 12 onto saw blade 16 so as to align the kerf cutting tip 28 of saw blade 16a between jaws 38 and 44.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A braze strength testing tool mountable onto the head of a torque wrench for testing the braze strength of a replaceable kerf tip brazed onto a saw blade tooth, the tool comprising a clamp supporting member for clamped mounting, at a first side thereof, to a kerf tip brazed to a saw blade tooth, and for mounting by a torque wrench mount, at an opposite side of said clamp supporting member, to the head of the torque wrench, a clamp having opposed facing jaws, for rigidly clamping the braze-on saw tip between said opposed facing jaws of said clamp, mounted to said clamp supporting member so as to orient said jaws in opposed facing relation on opposite sides of an axis of rotation of the head of the torque wrench when the head is mounted to said torque wrench mount on said second side of said member.

2. The tool of claim 1 wherein said clamp supporting member is an elongate housing for holding said clamp mounted thereto and wherein a first jaw of said jaws is a selectively moveable jaw translatable in a direction substantially parallel to an axis of rotation of the saw blade when said jaws are clamped on the kerf tip on the opposite sides of the kerf tip which are generally parallel to the opposite planar sides of the saw blade, so that the kerf tip is thereby clamped within a clamping space defined between said jaws.

3. The tool of claim 2 wherein said moveable jaw is selectively translated between a release position retracted away from the opposite jaw of said jaws by a selectively actuable actuator mounted to said housing, and a clamp engaging position wherein said moveable jaw is translated, into clamping engagement with the kerf tip between said jaws.

4. The tool of claim 3 wherein said translation is sliding translation along said housing.

5. The tool of claim 1 wherein said clamp supporting member is waisted adjacent said jaws so as to not interfere with either said clamping space or with adjacent saw blade teeth and their corresponding braze-on saw tips on saw blade teeth adjacent to said kerf tip clamped in said clamp clamping space.

6. The tool of claim 1 wherein said torque wrench mount is a bolt head mounted to said member for releasable engagement with the head of the torque wrench.

7. The tool of claim 1 wherein said torque wrench mount has an axis of rotation which is co-axial with an axis of rotation of the head of the torque wrench when the torque wrench is mounted on said wrench mount.

8. The tool of claim 7 wherein said axis of rotation of said mounting member also substantially bisects said clamping space when said moveable jaw is in said clamp engaging position, whereby said axis of rotation of said mounting member is substantially co-axial with an axis of the kerf tip so as to be substantially parallel to the brazing surface common to the clamped kerf tip and the saw blade tooth.

9. A method of testing the braze strength of a replaceable kerf tip brazed onto the tooth of a saw blade comprising the steps of:

a) providing a braze strength testing tool mountable onto the head of a torque wrench wherein the tool includes a clamp supporting member for clamped mounting, at a first side thereof, to the kerf tip brazed to the saw blade tooth, and for mounting by a torque wrench mount, at an opposite side of said clamp supporting member, to the head of the torque wrench, a clamp having opposed facing jaws, for rigidly clamping the braze-on saw tip between said opposed facing jaws of said clamp, mounted to said clamp supporting member so as to orient said jaws in opposed facing relation on opposite sides of an axis of rotation of the head of the torque wrench when the head is mounted to said torque wrench mount on said second side of said member, b) mounting the torque wrench onto the torque wrench mount, c) mounting said jaws over the kerf tip and clamping said jaws onto the kerf tip so as to intersect said axis of rotation of the head of the torque wrench generally collinearly with a long axis of said kerf tip parallel to the braze joint, d) rotating the torque wrench about it's axis of rotation and monitoring the torque level indicated by the torque wrench.

10. The method of claim 9 further including the step of providing an elongate housing for holding said clamp mounted thereto and providing a selectively moveable jaw of said jaws which is translatable in a direction substantially parallel to an axis of rotation of the saw blade when said jaws are clamped on the kerf tip on the opposite sides of the kerf tip which are generally parallel to the opposite planar sides of the saw blade, thereby clamping the kerf tip within a clamping space defined between said jaws.

11. The method of claim 10 further comprising the step of providing a selectively actuable actuator mounted to said housing and adjusting said moveable jaw by selective translation between a release position retracted away from the opposite jaw of said jaws, and a clamp engaging position wherein said moveable jaw is translated into clamping engagement with the kerf tip between said jaws urged by said acutator.

* * * * *